United States Patent [19]

Buckley

[11] Patent Number: 4,903,994

[45] Date of Patent: Feb. 27, 1990

[54] CONNECTORS

[75] Inventor: Norman Buckley, Aberdeen, Scotland

[73] Assignee: Hunting Oilfield Services Limited, Scotland

[21] Appl. No.: 268,182

[22] Filed: Nov. 7, 1988

[30] Foreign Application Priority Data

Nov. 17, 1987 [GB] United Kingdom ............... 8726879

[51] Int. Cl.⁴ .............................................. F16L 55/00
[52] U.S. Cl. ..................................... 285/26; 285/370; 285/421; 285/920
[58] Field of Search .................. 285/26, 29, 370, 397, 285/364, 406, 420, 421, 920

[56] References Cited

U.S. PATENT DOCUMENTS

| 3,122,383 | 2/1964  | Hirsch     | 285/397   |
| 3,406,989 | 10/1968 | Gross      | 285/370 X |
| 3,508,731 | 4/1970  | Jablonski  | 285/397 X |
| 3,754,780 | 8/1973  | Pogonowski | 285/421 X |
| 4,684,629 | 3/1987  | Baugh      | 285/26    |

Primary Examiner—Dave W. Arola
Attorney, Agent, or Firm—Watson, Cole, Grindle & Watson

[57] ABSTRACT

A connector assembly for connecting together fluid carrying lines comprises two hubs having the bores of the fluid carrying lines extending therethrough. Openings are provided in the hubs and a clamp is provided in the openings. The clamp is connected to one of the hubs and comprises a clamp body, an operating member and clamping members movable radially outwardly to clamp the juxtaposed hubs together, movement of the clamping members being caused by sliding of the operating member in the clamp body, the inclined external surfaces of the operating member co-operating with the similarly inclined inner ends of the clamping members. The interior of the operating member is hollow and defines a cylindrical internal cavity. A piston is provided in the cavity to form a piston and cylinder assembly for moving the operating member. A releasable lock prevents inadvertent release of the clamping members.

18 Claims, 3 Drawing Sheets

CONNECTORS

The present invention relates to connector assemblies for connecting one or more fluid carrying lines, e.g., for use subsea for connecting fluid carrying lines extending from a floating platform to apparatus, e.g., a manifold, installed on a submerged template.

According to the present invention there is provided a connector assembly for connecting together fluid carrying lines, comprising two hubs, each hub having an end face, at least one bore for fluid extending through the hub and opening into the end face, and an opening in the end face for clamping means, the bores and openings being alignable when the hub end faces are juxtaposed, the clamping means comprising a clamp body associated with the opening in one of the hubs and carrying a plurality of clamping members, the clamping members being movable relative to the clamp body between retracted inoperative positions and extended operative positions and being adapted in their operative positions to engage at least the other hub to clamp the hubs together when the openings and bores in the hubs are aligned and the end faces thereof are juxtaposed.

The connector assembly may comprise means for sealing the junction between the openings of the fluid bores in the end faces when the end faces are juxtaposed. These means may be carried by one hub or may be carried by an apertured plate positioned between the end faces when the hubs are clamped together.

The clamping members are advantageously adapted to engage both hubs for clamping the hubs together. The clamping means may comprise an operating member movable relative to the clamp body for moving the clamping members from their inoperative to their operative positions. The operating member may have a plurality of surface portions, each associated with a respective one of the clamping members, the surface portions being inclined relative to the direction of relative movement of the operating member. Inner faces of the clamping members may be arranged to slide over the surface portions upon relative movement of the operating member and the clamp body. The operating member may be movable axially with respect to the hubs and the surface portions may extend in the direction of movement thereof and may be planar.

The operating member and the clamping members may be coupled together by keying means for retracting the clamping members from their operative positions to their inoperative positions.

The clamping members, which may be equiangularly spaced around the periphery of the clamping means, are preferably retained in the clamp body relative to the one hub in a position generally aligned with the end face of the one hub.

The clamping members may be provided with means for engaging a portion of the wall of the opening in the other hub to clamp the hubs together. The wall portion may be arranged to face generally away from the end face of the other hub and may be provided by an annular ring or groove formed in the wall. Advantageously, the clamping members are provided with means for engaging the walls of the openings in both hubs.

The means for engaging the respective wall portions includes a surface portion of the clamping member which is arranged to face generally towards the end face of the respective hub. The surface portions and the corresponding wall portions are advantageously arranged to co-operate to force the end faces of the hubs closer together as the clamping members are extended into their operative positions. The surface portions of the clamping members and the or each wall portion of the or each opening are advantageously generally frustoconical.

The operating member may be provided internally with a cylindrical cavity divided into two chambers by a piston which is slidably mounted in the cavity and is attached to the clamp body, the operating member being moved relative to the clamp body by supplying pressurized fluid to the chambers. Advantageously, releasable locking means are provided to restrain the piston against movement relative to the operating member to prevent inadvertent release of the clamping members.

In a preferred embodiment, part at least of the clamp body is received in the opening in the one hub and is fixed relative to the one hub. The opening in each hub is advantageously provided generally in the centre of the hub and the or each bore extends through the respective hub generally parallel to the opening.

Further features of the present invention will become apparent from the following description of an embodiment thereof, given by way of example only, with reference to the accompanying drawings.

DETAILED DESCRIPTION OF THE PREFERRED EMBODIMENT

Figure 1:
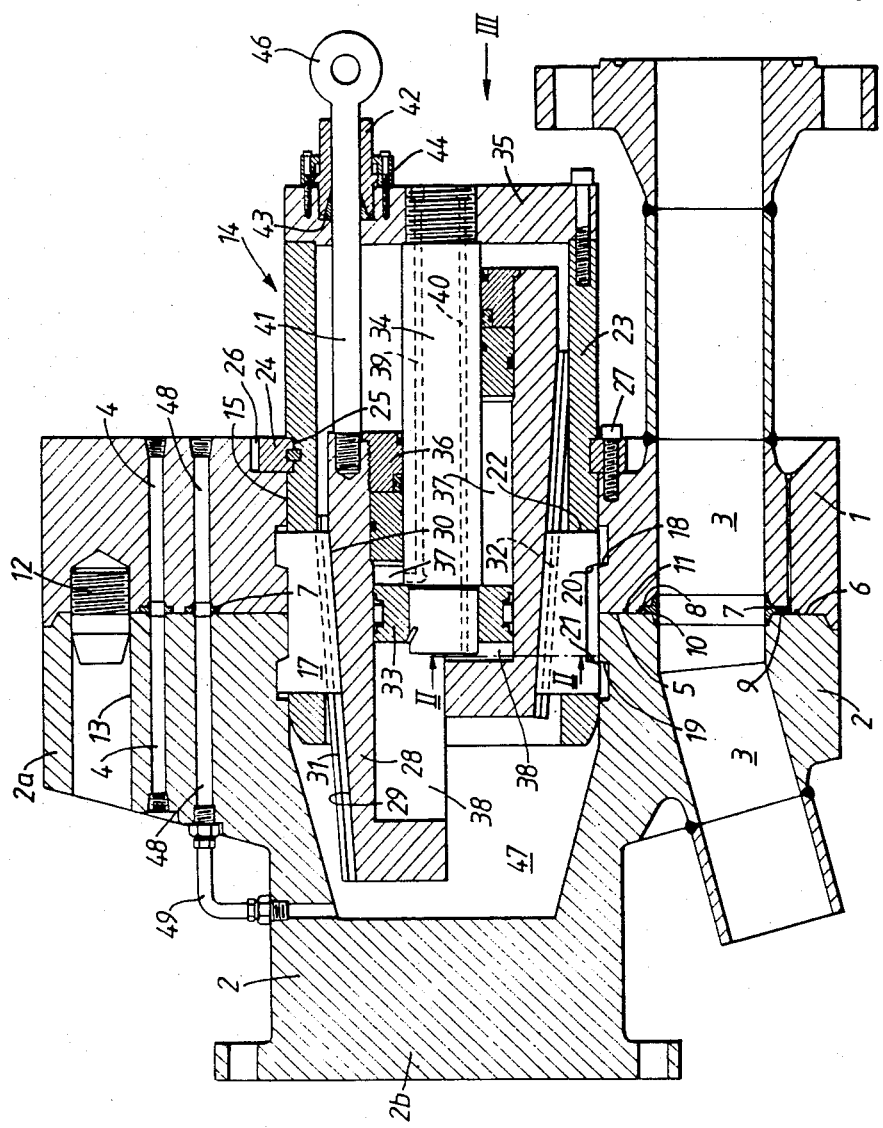
FIG. 1 is an axial section through an embodiment of connector assembly according to the present invention on the line I—I of FIG. 3 and shows the connector assembly in two conditions.
Figure 2:
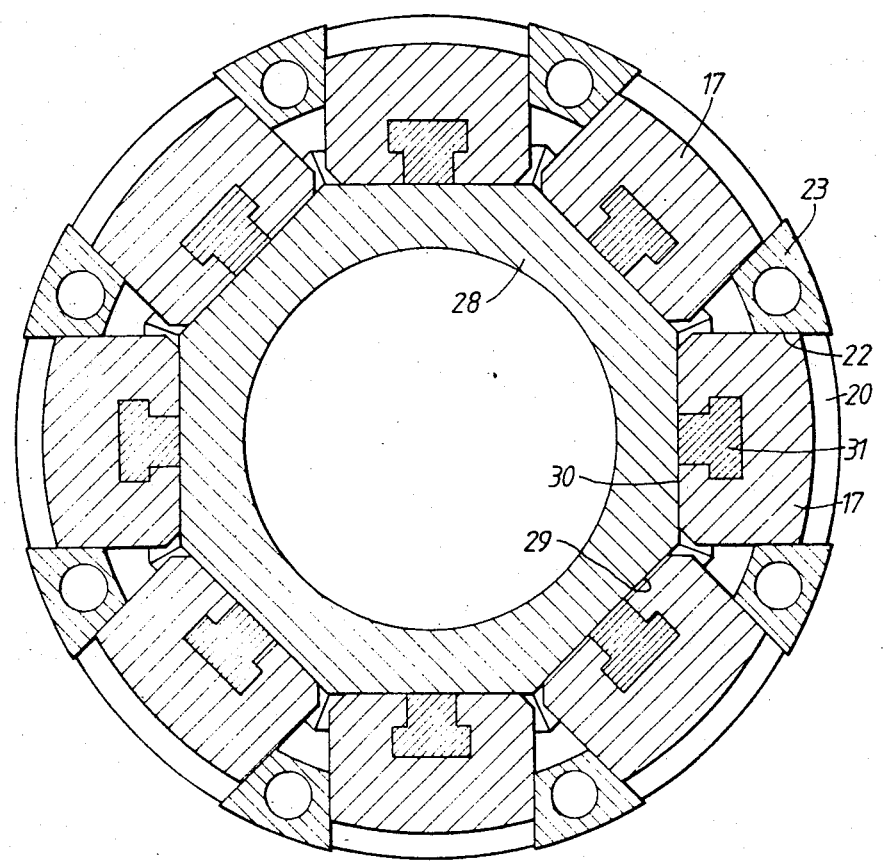
FIG. 2 is a section through the connector assembly of FIG. 1 on the line II—II of FIG. 1.
Figure 3:
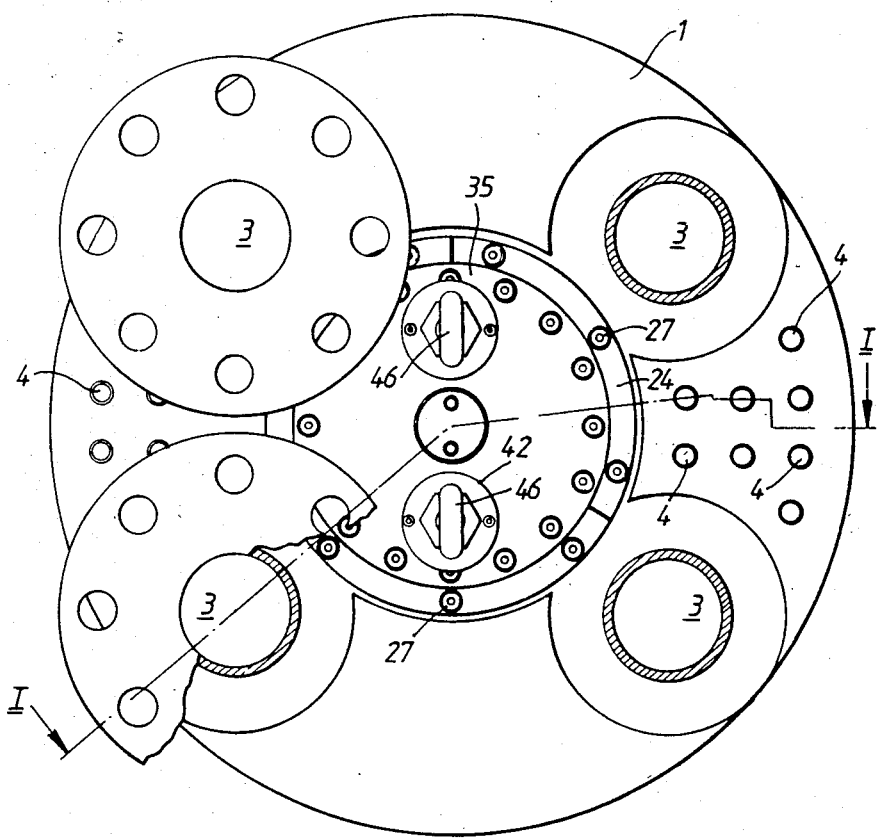
FIG. 3 is an end view of the connector assembly in the direction of the arrow III in FIG. 1.

The connector assembly shown in the drawings comprises first and second hubs 1, 2, each of which has at least one bore for fluid extending therethrough. As shown, the connector is intended for use in an oil production installation and specifically for connecting process and control fluid-carrying lines from a floating platform to equipment, e.g., a manifold, installed on a submerged platform. The bores thus comprise a plurality of bores 3 for carrying process fluid and a plurality of bores 4 for carrying control fluid. Other bores (not shown) may also be provided, if required, for electrical lines. All the bores 3, 4 open into inner end faces 5, 6 of the two hubs 1, 2 and are brought into communication when the end faces are juxtaposed. The end faces 5, 6 may, as shown, be brought together directly and seals 7 are provided in one or both end faces for sealing the connections between at least the fluid carrying bores. In this embodiment the seals 7 are provided in recesses 8 surrounding the openings of the bores in hub 1 and take the form of AX type metal seals which are releasably retained in the recesses by split rings 9 and which seal against frustoconical surfaces surrounding the openings of the bores in the end face 6 of hub 2. O-ring seals 11 may also be provided in the end face 5 of hub 1 surrounding at least each process fluid bore opening. In a modification, the end faces of the hubs may be juxtaposed with the interposition therebetween of separate sealing means, for example in the form of an apertured plate carrying seals for sealing the connections of at least the fluid carrying bores.

The outer ends of the bores 3, 4 open into outer end faces of the hubs for connection to fluid and/or electrical lines by appropriate means. For example, as shown, these ends of the bores may be threaded or shaped for welding.

The hubs are also provided with means for ensuring correct relative orientation of the hubs to ensure the correct bores are brought into communication and such means may, as shown, comprise one or more pins 12 fixed in the end face of one hub and received in a corresponding recess in the other hub. The or each pin 12 may, as shown, be threaded into the hub 1 and received in an opening 13 in hub 2 and the projecting end of the pin may be tapered to assist alignment of the hubs as the hubs are brought together.

The hubs 1, 2 are clamped together by clamping means 14 which engage the hubs through axially aligned openings 15, 16 in the hubs. In this embodiment, the opening 15, which is centrally positioned in hub 1, extends through the hub 1 with the result that the hub is annular. The clamping means 14 is, in this embodiment, associated with the hub 1. The opening 16, which is centrally positioned in hub 2, extends only part way though the hub 2, creating an annular part 2a, through which the bores 3, 4 extend, and a base part 2b, of a smaller diameter, by which the hub 2 may, as in this embodiment, be mounted on a fixed installation. In a modification, e.g., for use where the hub 2 is not to be fixed in place, hub 2 may comprise only the annular part 2a.

The clamping means 14 comprises a plurality of clamping members 17 movable radially of the openings 15, 16 between retracted inoperative positions (shown in the lower half of FIG. 1) and extended operative positions (shown in the upper half of FIG. 1) in which the members 17 engage the hubs to either side of the plane of the end faces 5, 6 to clamp the hubs together. As shown, eight clamping members 17 are provided equiangularly spaced around the axis of the central openings. It will however be appreciated that more or fewer clamping members may be provided depending on the circumstances and requirements of use of the connector.

Portions 18, 19 of the walls of the openings are arranged to face generally away from the end faces of the respective hubs 1, 2 for engagement with surface portions 20, 21 of the clamping members 17 which are arranged to face generally towards the end faces of the hubs. The wall portions 18, 19 may be provided by surfaces of annular rings or, as shown, annular grooves formed in the walls of the openings. The surface portions 20, 21 of the clamping members 17 and the wall portions 18, 19 of the openings may, as shown, be frustoconical and, if appropriately dimensioned, arranged to cooperate to force the end faces 5, 6 of the hubs 1, 2 together as the clamping members 17 are extended into their operative positions, to bring the end faces 5, 6 into abutment and/or to bring the seals into full effect and may pre-load the end faces and/or seals.

The clamping members 17 are axially retained relative to hub 1 in a position aligned with the end face 5 of the hub. As shown, the clamping members 17 are received in aligned openings 22 in the wall of a cylindrical clamp body 23, which in the illustrated embodiment is secured against axial movement relative to hub 1. As shown, the clamp body 23 is held in position by a split ring 24 which is received in a recess 25 in the wall of the body 23 and in a recess 26 in the rear end face of hub 1, to which hub the ring 24 is fixed by bolts 27.

Simultaneous movement of the clamping members 17 between their operative and inoperative positions is achieved by movement of an operating member 28 in the form of a tapered cylinder in the direction of the axis of the hubs. Portions 29 of the exterior surface of the operating members 28 are planar and inclined relative to the direction of movement of the operating member 28, each surface portion 29 being associated with a clamping member 17. The operating member 28 may, as shown, be generally frustoconical and polygonal in section. The radially inner or rear face 30 of each clamping member is planar and has an inclination corresponding to that of its associated surface portion 29 so that, as the operating member 28 is moved inwardly, the clamping members 17 slide on the surface portions 29 and are thereby moved radially outwardly. Each clamping member 17 is held against its associated surface portion 29 of the operating member 28 by keying means 31, 32 which may, as shown, comprise a T-shaped rail 31 provided on the surface portion 29, which is received in a correspondingly shaped slot 32 in the rear face of the clamping member. Thus, as the operating member is moved outwardly, the clamping members 17 are retracted to their inoperative positions.

The operating member 28 is moved axially by a hydraulic cylinder and piston means which may be mounted on the hub 1 or may, as shown, be provided within the operating member. As shown, the operating member 28 is provided internally with a cylindrical cavity which is closed at its inner end and forms the cylinder of a cylinder and piston assembly. The piston 33, which is fixed relative to the hub 1, is slidably mounted in the cavity on the end of a piston rod 34 which is fixed to, e.g., threaded into, an end plate 35 closing the outer end of the clamp body 23. The open end of the operating member 28 is provided with annular members 36 with seals for closing and sealing the gap between it and the piston rod 34. The piston 33 and operating member 28 together define two chambers 37, 38 supplied with hydraulic fluid through ducts 39, 40 in the piston rod, chamber 38 being pressurised to move the operating member 28 inwardly to move the clamping members 17 to their operative positions, and chamber 37 being pressurised to move the operating members 28 outwardly to move the clamping members 17 to their inoperative positions.

The cone angle of the outer surface of the operating member 28 is selected to correspond to the locking angle of the materials of the operating member 28 and clamping members 17 so that, when the clamping members 17 are in their operative positions they are jammed against the surface of the operating member 28. However, for full security additional releasable locking means may be provided for preventing inadvertent release of the clamping members. As shown, one or more rods 41 extend from the outer end of the operating member 28 through the plate 35 to be accessible from the exterior. A sleeve 42 surrounds the part of the rod 41 projecting from the plate, the inner end of the sleeve being conical and surrounding an annular array of wedges 43 held captive between the sleeve 42 and the plate 35. The sleeve 42 is threaded into a collar 44 fixed to plate 35 for movement between a clamping position in which the wedges 43 are clamped against the rod 41 to prevent axial movement of the rod, and an inoperative position in which the rod 41 can slide relative to the wedges and sleeve. The wedges 43 may be retained against plate 35 to prevent inadvertent operation of the locking means when the rod is moving outwardly relative thereto The or each rod 41 may also be used for manual release of the clamping members 17 in the event of jamming or failure of the hydraulic cylinder and piston assembly and to this end may, as shown, be provided with a ring 46 or other terminal for manual engagement.

In use of the above-described connector, hub 2 is conveniently fixed in place with its bores connected to appropriate fluid lines, with the axis of central opening 16 vertical and the opening 16 opening upwardly. Hub 1 with its bores connected to appropriate fluid lines and the clamping members in their retracted positions is then lowered onto hub 2, orientated relative to hub 2 to permit the pins 12 to engage in their recesses or openings 13, and the clamping assembly is then operated to clamp the juxtaposed hubs together.

Particularly where the connector is in use submerged, it may be advantageous to fill the space 47 within the connector, which would otherwise be occupied with water, with a non-corrosive fluid which is denser than water, such for example as silicon. For this purpose, the hubs 1,2 have a further bore 48. The outer end of the bore 48 in hub 1 is connected by a pipe to a supply of silicon and the outer end of the bore in hub 2 is connected by a pipe 49 to the lower end of space 47. As space 47 is filled with silicon through bore 48, the displaced water will flow out through spaces between the hubs 1, 2 and the retaining member 23 and between the clamp body 23 and the operating member 28 and through openings in the plate 35. By virtue of the central location of the clamping assembly and the circumferential arrangement of the bores in the hubs, the overall mass and complexity of the connector can be substantially reduced as compared with similar types of connectors having circumferential clamping assemblies.

The hubs and associated components may be made of any suitable materials depending on the type of use to which the connector is put and the circumstances of use. For subsea use, they are made of appropriate steels.

What is claimed is:

1. A connector assembly for connecting together fluid-carrying lines, comprising two hubs, each hub having an end face, at least one bore for fluid extending through each said hub and opening into the end face thereof, and an opening in each said end face for clamping means, said bores and openings being alignable when said hub end faces are juxtaposed, the clamping means comprising a clamp body associated with said opening in one of said hubs, a plurality of clamping members carried by said clamp body and movable relative to said clamp body between retracted, inoperative positions and extended, operative positions, an operating member movable in an axial direction relative to said clamp body, said operating member comprising a plurality of planar surface portions inclined relative to said axial direction of movement of said operating member, each said clamping member being associated with a respective planar surface portion and having an inner face arranged to slide over said respective surface portion upon relative movement of said operating member and said clamp body to move said clamping members from their inoperative to their operative positions, said clamping members being adapted in their operative positions to engage at least said other hub to clamp said hubs together when said openings and bores in said hubs are aligned and said end faces thereof are juxtaposed.

2. A connector assembly as claimed in claim 1, comprising means for sealing the junction between the openings of the fluid bores in the end faces when the end faces are juxtaposed.

3. A connector assembly as claimed in claim 1, wherein the clamping members are adapted to engage both hubs for clamping the hubs together.

4. A connector assembly as claimed in claim 1, wherein the opening in each hub is provided generally in the centre of the hub and each bore extends through the hub generally parallel to the opening.

5. A connector assembly as claimed in claim 1, wherein the operating member and the clamping members are coupled together by keying means for retracting the clamping members from their operative to their inoperative positions.

6. A connector assembly as claimed in claim 1, wherein the clamping members are equiangularly spaced around the periphery of the clamping means.

7. A connector assembly as claimed in claim 1, wherein the clamping members are retained in the clamp body relative to said one hub in a position generally aligned with the end face of said one hub.

8. A connector assembly as claimed in claim 1, wherein the clamping members are provided with means for engaging a portion of the wall of the opening in said other hub to clamp the hubs together.

9. A connector assembly as claimed in claim 8, wherein the wall portion of the opening is arranged to face generally away from the end face of said other hub.

10. A connector assembly as claimed in claim 9, wherein the wall portion is provided by an annular groove formed in the wall.

11. A connector assembly as claimed in claim 9, wherein the wall portion is provided by an annular ring formed in the wall.

12. A connector assembly as claimed in claim 9, wherein the clamping members are provided with means for engaging the walls of the openings in both hubs.

13. A connector assembly as claimed in claim 8, wherein the leans provided on the clamping members for engaging the wall portion of the opening include surface portions arranged to face generally towards the end face of the respective hub.

14. A connector assembly as claimed in claim 13, wherein the surface portions of the clamping members and the wall portion of the or each opening are arranged to co-operate to force the end faces of the hubs closer together as the clamping members are extended into their operative positions.

15. A connector assembly as claimed in claim 13, wherein the surface portions of the clamping members and the wall portion of the or each opening are generally frustoconical.

16. A connector assembly for connecting together fluid-carrying lines, comprising two hubs, each hub having an end face, at least one bore for fluid extending through each said hub and opening into the end face thereof, and an opening in each said end face for clamping means, said bores and openings being alignable when said hub end faces are juxtaposed, said clamping means comprising a clamp body at least partially received in the opening in one of said hubs, said clamp body being fixed relative to said one hub and carrying a plurality of clamping members, an operating member movable relative to said clamp body for moving said clamping members from retracted, inoperative positions to extended, operative positions, said clamping members being adapted in their operative positions to engage said hubs to clamp said hubs together when said openings and bores in said hubs are aligned and said end faces thereof are juxtaposed, and means for moving said operating member, wherein said operating member is provided internally with a cylindrical cavity divided into two chambers by a piston slidable in said cavity, and said piston is fixed relative to said clamp body, said operating member being movable relative to said clamp body by the supply of pressurized fluid to said chambers.

17. A connector assembly as claimed in claim 16, wherein releasable locking means are provided to restrain the piston against movement relative to the operating member to prevent inadvertent release of the clamping members.

18. A connector assembly for connecting together fluid-carrying lines, comprising two hubs, each hub having an end face, at least one bore for fluid extending through each said hub and opening into the end face thereof, and an opening in said end face for clamping means, said bores and openings being alignable when said hub end faces are juxtaposed, the clamping means comprising a clamp body associated with said opening in one of said hubs, a plurality of clamping members carried by said clamp body and movable relative to said clamp body between retracted, inoperative positions and extended, operative positions, an operating member movable in an axial direction relative to said clamp body, said operating member comprising a plurality of surface portions extending generally in said axial direction of movement of said operating member and being of constant inclination relative thereto, each said clamping member being associated with a respective surface portion and having an inner face arranged to slide over said respective surface portion upon relative movement of said operating member and said clamp body to move said clamping members radially with respect to the direction of movement of said operating member from their inoperative to their operative positions, said clamping members being adapted in their operative positions to engage at least said other hub to clamp said hubs together when said openings and bores in said hubs are aligned and said end faces thereof are juxtaposed.

* * * * *